United States Patent
Aylsworth

(10) Patent No.: US 10,421,209 B2
(45) Date of Patent: Sep. 24, 2019

(54) ADAPTABLE LUMBER RETRIEVAL METHOD

(71) Applicant: Steven L. Aylsworth, Chatfield, MN (US)

(72) Inventor: Steven L. Aylsworth, Chatfield, MN (US)

( * ) Notice: Subject to any disclaimer, the term of this patent is extended or adjusted under 35 U.S.C. 154(b) by 412 days.

(21) Appl. No.: 15/331,824

(22) Filed: Oct. 22, 2016

(65) Prior Publication Data

US 2017/0050334 A1 Feb. 23, 2017

Related U.S. Application Data

(60) Continuation-in-part of application No. 14/577,779, filed on Dec. 19, 2014, now Pat. No. 10,280,006, which is a division of application No. 13/136,922, filed on Aug. 15, 2011, now Pat. No. 8,960,244.

(60) Provisional application No. 61/402,654, filed on Sep. 2, 2010, provisional application No. 62/324,151, filed on Apr. 18, 2016.

(51) Int. Cl.
 *B27B 31/00* (2006.01)
 *B23D 59/00* (2006.01)

(52) U.S. Cl.
 CPC ............ *B27B 31/00* (2013.01); *B23D 59/001* (2013.01)

(58) Field of Classification Search
 CPC .................................. B27B 31/00; B23D 59/001
 See application file for complete search history.

(56) References Cited

U.S. PATENT DOCUMENTS

| | | |
|---|---|---|
| 561,715 A | 6/1896 | Lynch |
| 2,730,144 A | 1/1956 | Joa |
| 3,116,835 A | 1/1964 | Brandon |
| 3,254,764 A | 7/1966 | Boyle |

(Continued)

FOREIGN PATENT DOCUMENTS

| | | |
|---|---|---|
| DE | 2501012 A1 | 7/1976 |
| DE | 4317767 A1 | 12/1994 |

(Continued)

OTHER PUBLICATIONS

Stiles, Weinmann Robotic Saw System and Material Handling Portal, sales advertisement in SBC magazine; 1 page; Madison, WI; published Sep. 2008.

(Continued)

*Primary Examiner* — John C Hong
(74) *Attorney, Agent, or Firm* — bobharter.com; Robert J. Harter

(57) ABSTRACT

A lumber retrieval method renders a lumber handling system readily adaptable to compensate for irregular floors, an irregular overhead track, and variable station locations. In some examples, the method involves laser scanning the top profile of multiple stacks of lumber, each of which contain boards of a unique size. Based on the scanned profiles and the size of the boards, the method determines and displays the number of boards at each station. In some examples, the system provides a calibration mode that automatically determines the discrete locations of multiple stacks of lumber and compensates for a nonparallel relationship between the track and the floor. In some examples, the scanning and calibration process help determine the quantity of boards at each station.

9 Claims, 8 Drawing Sheets

(56) References Cited

U.S. PATENT DOCUMENTS

| | | |
|---|---|---|
| 3,272,044 A | 9/1966 | Obenshain |
| 3,873,000 A | 3/1975 | Eaton et al. |
| 3,894,625 A | 7/1975 | Boyle et al. |
| 3,952,883 A | 4/1976 | Phillips |
| 4,185,672 A | 1/1980 | Vit et al. |
| 4,560,456 A | 12/1985 | Heil et al. |
| 4,610,360 A | 9/1986 | Forslund |
| 4,640,655 A | 2/1987 | Jacobsen |
| 4,838,748 A | 6/1989 | Johnson |
| 5,096,090 A | 3/1992 | Schwartz et al. |
| 5,249,915 A | 10/1993 | Ritola |
| 5,806,868 A | 9/1998 | Collins |
| 5,879,129 A | 3/1999 | Newnes et al. |
| 5,893,468 A | 4/1999 | Holmes |
| 5,899,659 A | 5/1999 | Beilsmith |
| 6,065,927 A | 5/2000 | Baron et al. |
| 6,379,105 B1 | 4/2002 | Aylsworth |
| 6,923,614 B2 | 8/2005 | Aylsworth |
| 7,736,120 B2 | 6/2010 | Pierson et al. |
| 7,746,481 B2 | 6/2010 | Kranz et al. |
| 7,950,316 B2 | 5/2011 | Koskovich |
| 8,348,287 B1 | 1/2013 | Smith |
| 8,960,244 B1* | 2/2015 | Aylsworth .............. B27B 31/00 144/245.5 |
| 2003/0006586 A1 | 1/2003 | Comilla |
| 2017/0113882 A1* | 4/2017 | Aylsworth ............. B27B 31/00 |
| 2017/0217022 A1* | 8/2017 | Aylsworth ........... B25J 15/0019 |

FOREIGN PATENT DOCUMENTS

| | | |
|---|---|---|
| DE | 19617818 A1 | 11/1997 |
| FR | 2673923 A1 | 9/1992 |
| FR | 2675493 A1 | 10/1992 |

OTHER PUBLICATIONS

SBC; SBC Magazine; 33 pages; Madison, WI; Sep. 2008.

Miser; Automated Wood Processing System; Koskovich brochure; 5 pgs.; Rochester, MN; copyright 2007.

Omni; Automated Lumber Processing System; CAD drawings; 2 pgs.; published 2008 or earlier.

Wood Truss Systems; 2006 Weinmann WBZ 100 Linear Saw; sales advertisement; 2 pgs., equipment itself in publich domain in 2006 or earlier.

Handling Portal WHP; Weinmann sales specs.; one page; published 2008 or earlier.

Stiles; Weinmann Robotic Saw System; sales literature and equipment specs; 6 pages; equipment itself in public domain in 2006 or earlier.

* cited by examiner

FIG. 5
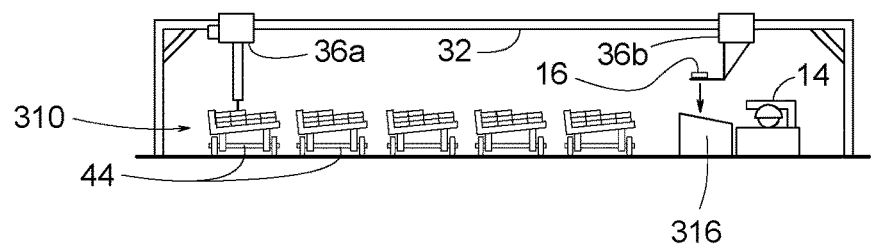
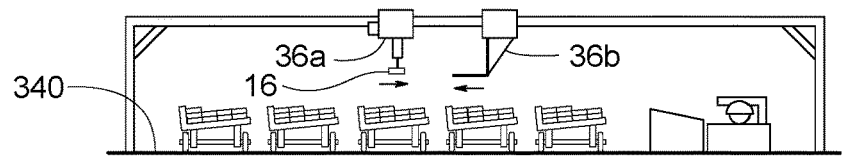
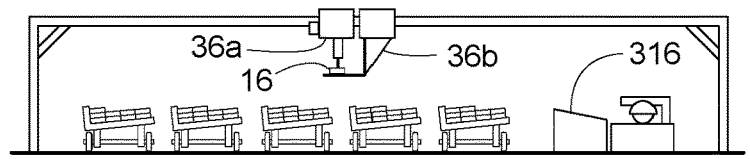
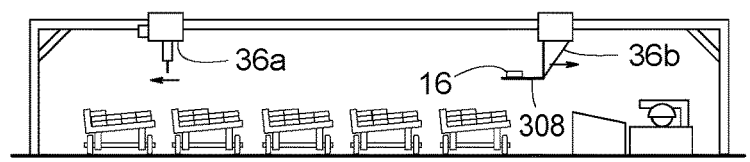

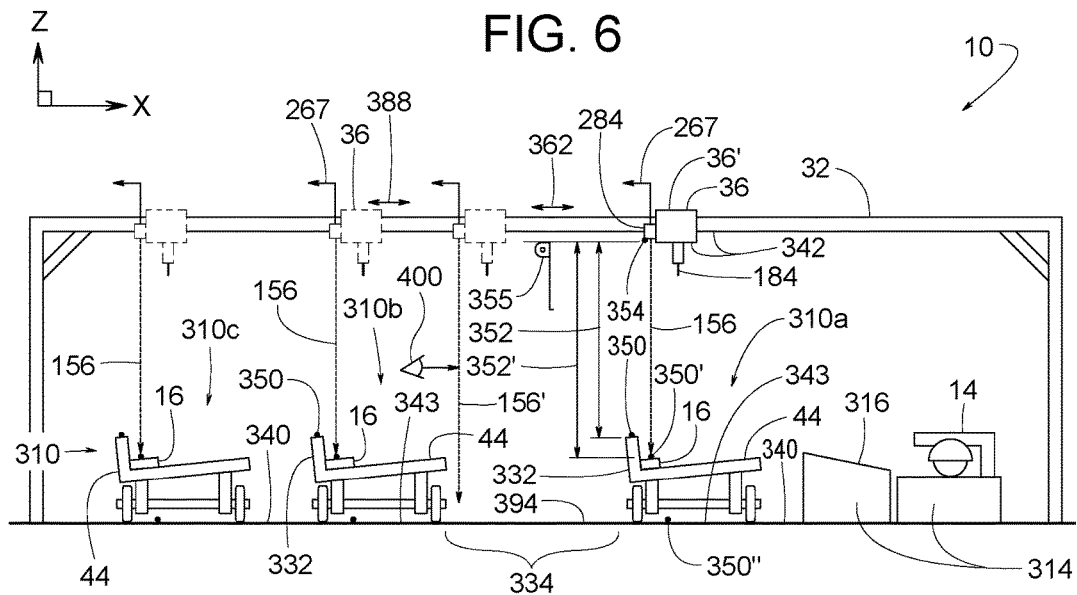
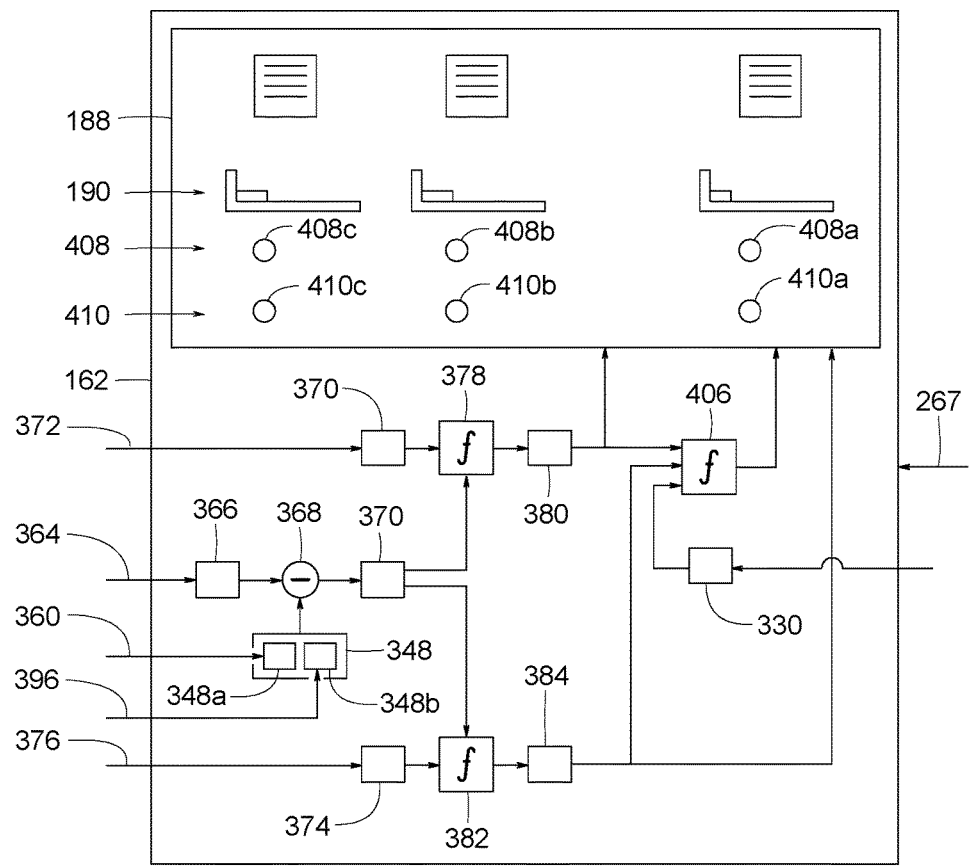
FIG. 6

ADAPTABLE LUMBER RETRIEVAL METHOD

CROSS REFERENCE TO RELATED APPLICATIONS

This present application is a continuation-in-part of U.S. patent application Ser. No. 14/577,779 filed on Dec. 19, 2014; which is a division of U.S. patent application Ser. No. 13/136,922 filed on Aug. 15, 2011 now U.S. Pat. No. 8,960,244; which claims priority to provisional patent application No. 61/402,654 filed on Sep. 2, 2010. This present application also claims priority to provisional patent application No. 62/324,151 filed on Apr. 18, 2016. Each of the aforementioned applications and U.S. Pat. No. 8,960,244 are specifically incorporated herein by reference.

FIELD OF THE DISCLOSURE

This provisional patent application generally pertains to material handling and more specifically to the retrieval and delivery of lumber.

BACKGROUND

Various machines and methods have been developed for retrieving individual pieces of lumber or boards stacked at one location and feeding the boards individually to a saw. Examples of such systems are disclosed in U.S. Pat. Nos. 6,379,105 and 6,923,614; each of which are specifically incorporated herein by reference. Additional lumber handling systems are disclosed in U.S. Pat. Nos. 2,730,144; 3,873,000 and 3,952,883; each of which are specifically incorporated herein by reference. A lumber processing system for making prefabricated trusses and panels is disclosed in U.S. Pat. No. 7,950,316; which is specifically incorporated herein by reference.

BRIEF DESCRIPTION OF THE DRAWINGS

FIG. 5 is a series of diagrams showing a side view of various example systems and methods for automatic lumber retrieval systems in accordance with the teachings disclosed herein.

FIG. 6 is a schematic diagram showing an example system and method for automatically setting up and calibrating lumber stations for an automatic lumber retrieval system in accordance with the teachings disclosed herein.

DETAILED DESCRIPTION

Figure 1:
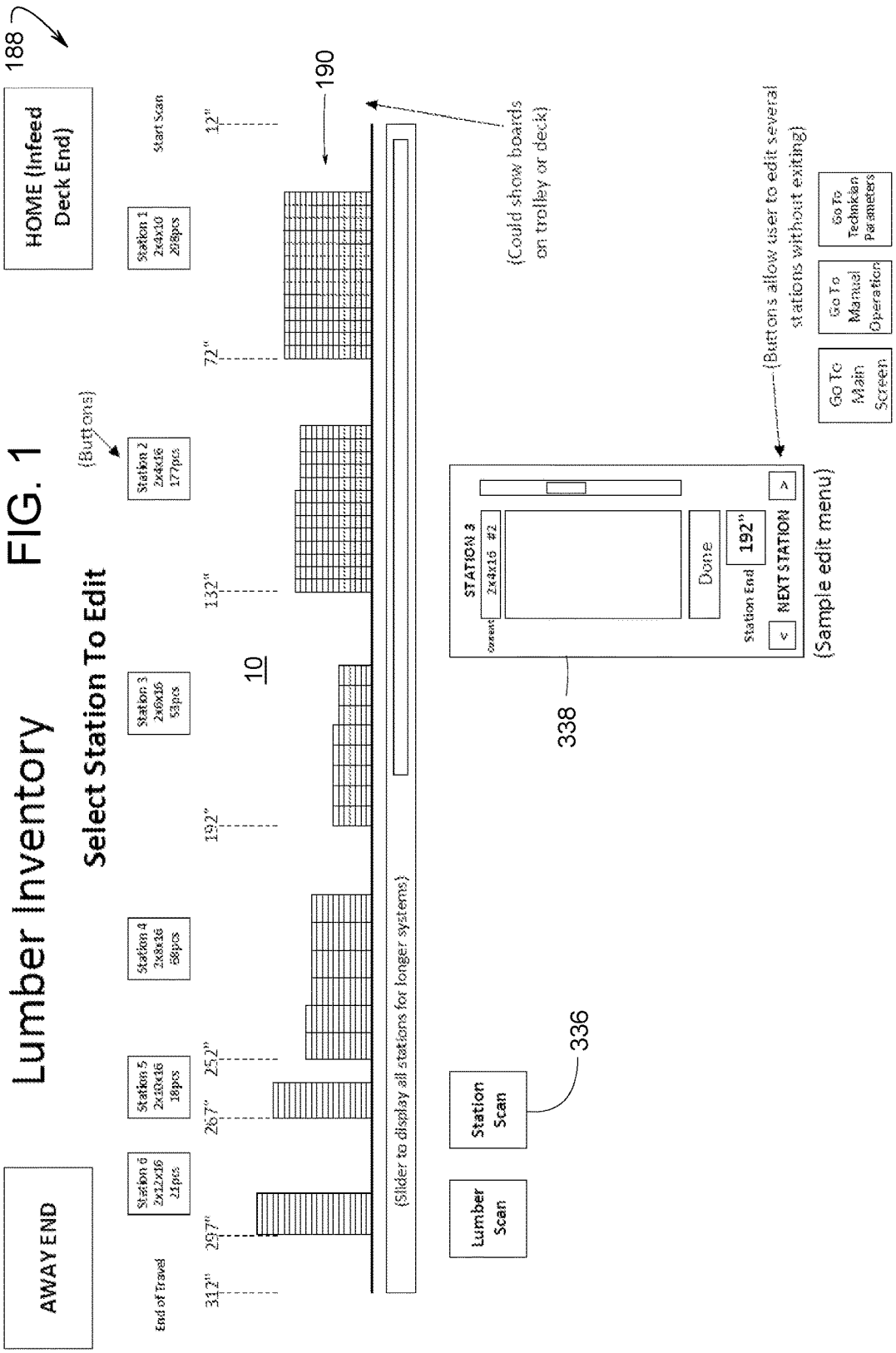
FIG. 1 is a schematic diagram showing an example system and method for automatically setting up and calibrating lumber stations for an automatic lumber retrieval system in accordance with the teachings disclosed herein.

Floor/Track Compensation, Define Stations and Monitor Inventory (FIG. 1)

FIGS. 1-5 illustrate examples of a lumber retrieval system 10 and related methods that applies to the systems and methods disclosed in U.S. Pat. No. 8,960,244; which is specifically incorporated herein by reference. Items in FIGS. 1-9 having the same or similar reference numbers as those found in U.S. Pat. No. 8,960,244 generally correspond to similar or identical items of that patent.

The illustrated lumber retrieval system 10 enables users to rapidly change lumber station numbers and locations during the course of a day. Another feature covered here is calculating the quantity of boards 16 in each station 310 (e.g., first station 310a, second station 310b, third station 310c, etc.). This information can be used at the start of a job to determine if there is enough lumber in the system to complete a job order 330 (FIGS. 6 and 7) without hand-counting individual boards 16. This information can also be used during a job to alert the operator (user) that a station 310 is getting low on lumber and allows the operator to prepare more lumber for loading.

In some examples, stations 310 are set by jogging trolley 36 until a laser dot or laser beam 156 of laser unit 284 is a half-inch past the end point of a station 310. In some examples, the end point of that station is then defined by a back stop 332 (upright part) of a lumber support 44 (e.g., a cart or rack) or magazine station. The position value at that point is recorded and then manually entered into the corresponding station input box of a controller 162. This is repeated for each station 310 until all stations are calibrated. The process of positioning the laser dot manually by jogging can be time consuming and might require two persons, one to jog trolley 36 and the other to view its position. In such examples, to reconfigure the system, it is necessary to repeat the manual steps and enter the values. In some examples, lumber supports 44 or stations 310 must have at least a two-inch gap 334 between the end point of one station 310 and the beginning point of the next station 310. In some examples, this is defined in software in controller 162 to differentiate between the start of the next station versus a single station with a small gap between boards.

In addition or alternatively, system 10 accomplishes the aforementioned method automatically via a scanning algorithm used in the board pick up process. In this case, the operator places one or more boards 16 in each desired station 310 with one of the boards 16 against the station's back stop 332, as shown in FIG. 6. The operator pushing a "Station Scan" button 336 on controller 162 (e.g., on the controller's touchscreen 188 sends trolley 36 and its laser unit 284 down the full length of the system, thereby locating and recording the end point of each station 310. When this scan is performed, the lumber in each station 310 must not have any horizontal gaps between boards greater than two inches. In some examples, a valid station location is the end point found when scanning identifies at least a two-inch empty space (no lumber) beyond it. The beginning of any station 310 beyond the currently found station is automatically defined to start two inches beyond the end point of the current station, assuming lumber and an end point is found for the next station.

Once stations 310 are located and defined, a graphical representation (e.g., image 190) of each located station 310 and its overall dimensions are displayed on the operator's control screen 188. In some examples, the end point for each station 310 is also displayed. Stations 310 are sequentially numbered by the software. A cross sectional view (image 190) of the lumber stack is displayed as defined by a height measurement made by laser unit 284 and a horizontal location for each height measurement based on the encoded trolley/laser position along track 32.

At this point, system 10 might not be aware of the size of the individual boards 16 in each station 310 because several boards 16 may be positioned tightly against each other, side-by-side. To set the size, in some examples, the operator selects the graphical representation of an individual station (e.g., via touchscreen 188 or mouse), and a selection box 338 appears with lumber size and description choices. After choosing a size (2×4 for example), the software produces a grid work of rectangles based on the cross sectional size of a 2×4 and overlays the grid onto the displayed view of the lumber stack cross section, thus showing the size and stacked location of individual boards 16. In this manner each station 310 is rapidly defined and set up. Another variation of this would be to place only one board 16 in each station 310 and let the scanning determine and automatically set the lumber size. This might be useful at initial setup of the machine before quantities of lumber are added.

Knowing the height, width, shape and size of the lumber allows easily calculating the quantity of boards 16 in each station 310. One possible problem with calculating the exact height of the lumber stack, however, is that individual stations 310 may vary in elevation because of changes in floor height. The truss, framework or track 32 supporting trolley 36 and laser unit 284 may also bow up or down, which would affect the height measurement of the stack as seen by laser unit 284. In some examples, compensation for this at machine installation and startup is done by "mapping" the height variation over the length of the system.

One way to accomplish this would be to place one board 16 in each available station 310 and scan the entire length to record the heights of boards 16 and their horizontal location within the system. This would define the height error over the length of the system as it was installed, taking into account any height variation of floor 340 and track 32. The resulting "map" is then used to automatically adjust the height readings of lumber stacks in stations 310, thus allowing the system to correctly calculate the number of boards 16 in each station 310. Another way to map the system height is to physically measure the height of laser unit 284 to floor 340 (e.g., with a tape measure) at various horizontal locations and input the measured values into software of controller 162 to create a calibration map.

In some examples, a lumber handling method for retrieving a plurality of boards of various sizes from a plurality of stations supported by a floor is defined as comprising: a trolley carrying a laser scanner over the plurality of stations; the laser scanner scanning the plurality of boards; identifying discrete stations of the plurality of stations based on scanning at least a predetermined gap size between two adjacent stations of the plurality of stations; calculating a floor compensation for a potential variation in floor height of the floor; calculating a trolley compensation for a potential error in a linearity of a travel path of the trolley; calculating a number of boards in a chosen station of the plurality of stations based on a size of a board at the chosen station, a laser-scanned map of the chosen station, the floor compensation and/or the trolley compensation; and providing a notification of when the number of boards in the chosen station decreases to a predetermined lower limit.

Figure 2:
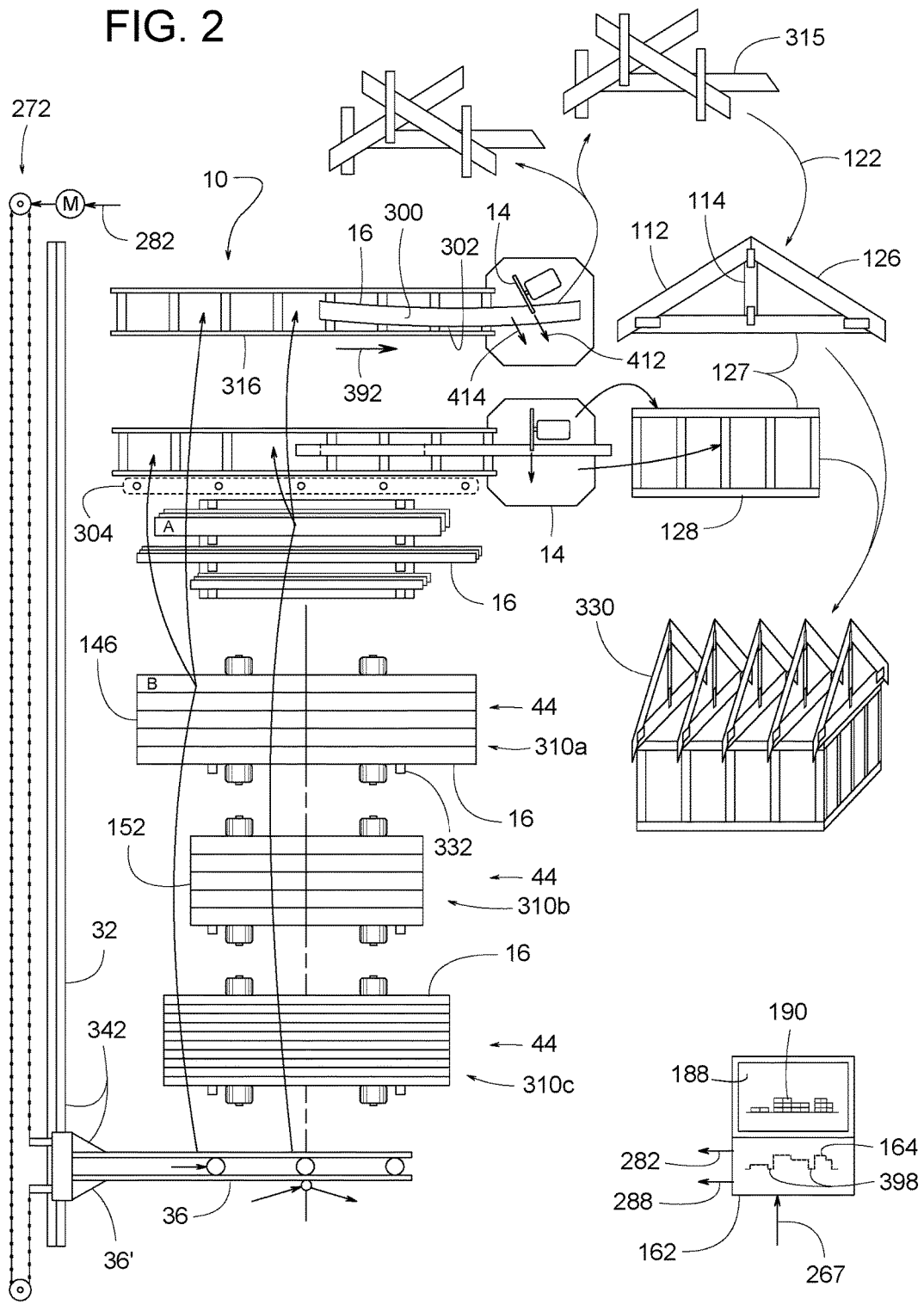
FIG. 2 is a top view similar to FIG. 1 of U.S. Pat. No. 8,960,244.

Trolley Speed Function of Board Weight/Length (FIG. 2)

A lumber delivery machine might present hazards to personnel working nearby and are generally protected with a "light curtain" safety device which senses a person entering a dangerous area of the machine's operating space. The danger might involve being struck by traveling machine parts or the board which is being transported by machine 10. The light curtain consists of one or more light beams from an emitter that are monitored continuously by a receiver. Light curtains are well known and commonly used for safety protection. A worker entering the protected zone will break one of the beams and initiate a rapid stop of the machine. This is typically done by disconnecting power to the drive motors and applying a brake to rapidly stop the machine when personnel are detected. The light curtain safety device is located beyond the dangerous area and set back an additional distance to allow the machine to come to a complete stop before the personnel can reach the hazardous movement. The amount of setback is determined by using a safety formula which is accepted by the applicable safety agency or authority having safety jurisdiction. The approach speed of a person and the stopping time of the machine are used in the equation to compute setback requirements. Higher machine speeds increase the stopping time of the machine and accordingly require a larger setback of the light curtain. Larger setbacks, while desirable for safety reasons, usually use valuable plant space and are therefore regarded as unproductive. The tradeoffs between safety light curtain setback (unproductive space) and machine speed (more productivity) are reduced with the present invention.

Lumber retrieval machine 10 includes trolley 36 and is set up to deliver different sizes of boards 16 from a plurality of stations 310 to a saw 14 or other secondary process. Boards 16 can vary in length from as short as 5 ft to as long as 24 ft. Safety light curtains are setback from the hazard, which may be the end of a 24-ft board or may be the moving trolley 36 of machine 10, depending on whether a board 16 is being retrieved or whether trolley 36 is returning for another board and is not carrying a board. It can be seen from this explanation that the distance to the safety hazard varies depending on the length of a board being carried and whether a board 16 is even present. This fact allows the trolley travel speed (and hence the stopping distance) to also be variable based on the presence or absence of a board and the board's length. In some examples, a suitable board length detection system accomplishes this. The detection system could take many forms. One method, for example, would be based on sensors to measure the boards (length, width, thickness, and/or weight) and another would require board measurement input (length, width, thickness, and/or weight) from the sawing process being fed by lumber delivery system 10. Using this information, the maximum speed is easily calculated and implemented by the processor controlling trolley 36 and lumber delivery system 10. This allows trolley 36 to travel faster when unloaded or when carrying a shorter or lighter board.

In some examples, the invention is defined as a lumber handling method of using a trolley 36 for retrieving a board 16 from a plurality of boards of various sizes from a plurality of stations 310 and transferring board 16 toward saw 14, wherein the lumber handling method comprises: the trolley traveling over at least one station of the plurality of stations while the trolley is carrying the board; the trolley traveling over the at least one station while the trolley is not carrying the board; and limiting a travel speed of the trolley based on at least one of the following: (a) a weight of the board, (b) a length of the board, and (c) whether or not the trolley is carrying the board.

In some examples, a lumber handling method of using a trolley for retrieving a board from a plurality of boards of various sizes from a plurality of stations and transferring the board toward a saw is defined as comprising: the trolley traveling over at least one station of the plurality of stations while the trolley is carrying the board; the trolley traveling over the at least one station while the trolley is not carrying the board, and limiting a travel speed of the trolley based on at least one of a weight of the board and a length of the board.

Figure 3:
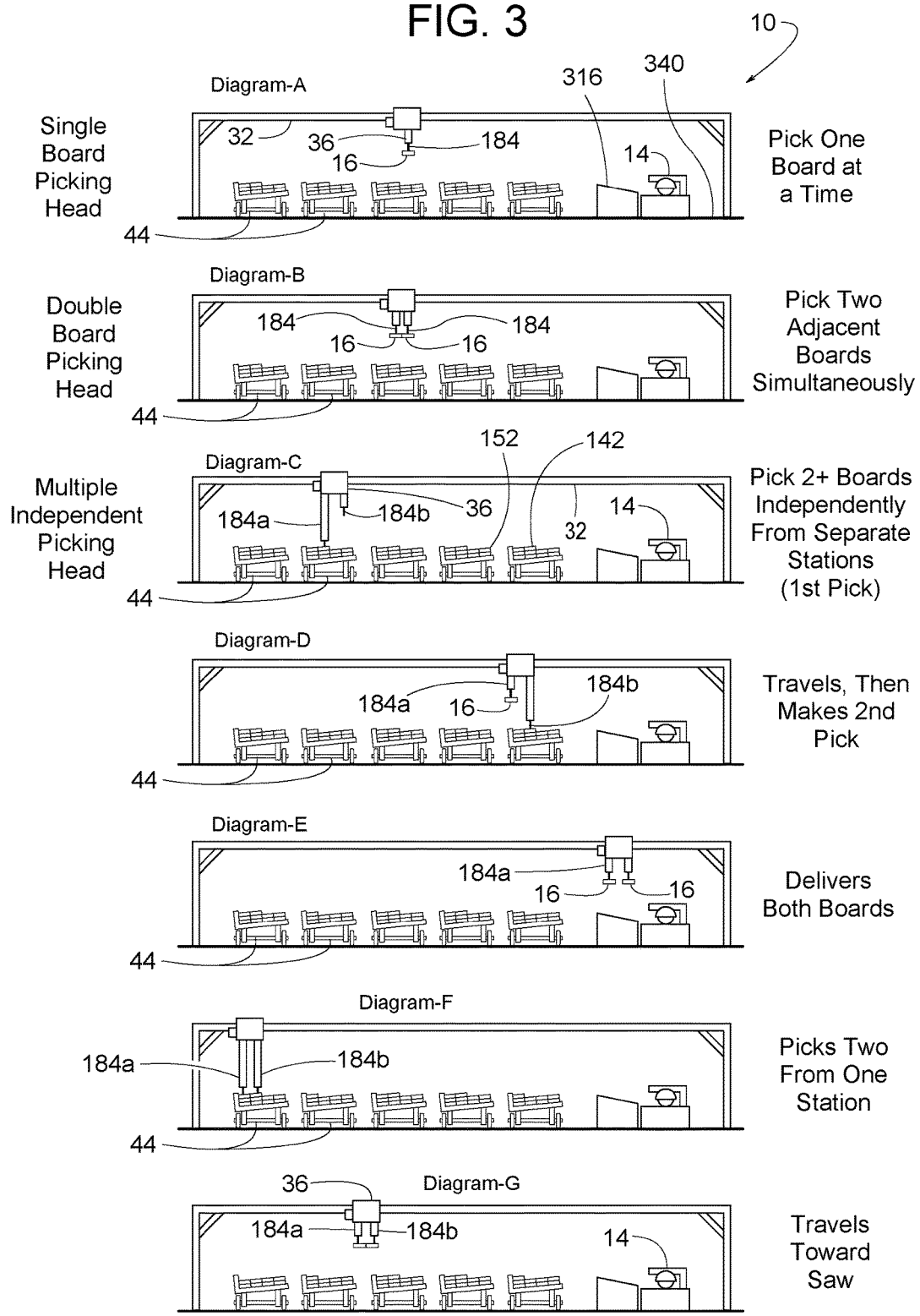
FIG. 3 is a series of diagrams showing a side view of various example systems and methods for automatic lumber retrieval systems in accordance with the teachings disclosed herein.

Independent Dual Head (FIG. 3)

Some examples of lumber retrieval system 10 include a single set of board pickers 184 (for picking up one board 16), as shown in Diagram-A of FIG. 3. Other examples include two sets of board pickers 184 (for picking up two boards 16 of equal or different size), as shown in Diagram-B of FIG. 3. Board picker 184 is schematically illustrated to represent any apparatus capable of lifting board 16 up from a lumber support or stack of lumber. Examples of board picker 184 include, but are not limited to, piercing tools, suction cups, hooks, grippers, etc. The single head version can retrieve a single board 16 in one cycle and deliver it to saw 14 or other process. The double board picking head version can pick up two boards 16 at once and deliver them in a single cycle. In some examples, both use a single vertical pickup axis. Some double board versions are equipped with multiple pick up devices (board picker) on a single head making it capable of lifting two boards simultaneously and delivering them to the process. This speeds the delivery of lumber when compared to the single board version especially in the case of a large system where travel time increases due to the length of travel required.

The single head version has delivery speed limitations based on delivering only one board per cycle. Some two board versions can improve on the delivery speed, but only under certain circumstances. In some versions, two boards being picked up must lie adjacent to each other. In some examples, the pickup devices for each board are a fixed distance apart making it unsuitable for two boards that are not spaced to match the fixed distance. This limits its use to certain sizes of boards. In such examples, any two boards must be picked up simultaneously which means they must come from the same lumber stack. Because boards in stacks are often skewed it is not possible or desirable to pick up a board on one stack and then lower the first picked board again to pick up from a second stack, as the board being lowered may interfere with the second lumber stack. Requiring the two boards to come from the same stack and hence be the same dimensions is a limitation of such systems. Some end processes, such as sawing, may require different sized boards in the cutting sequence making it undesirable to deliver two like-sized boards at once. A further disadvantage lies in the fact that the double board head must retrieve adjacent boards. Sometimes adjacent boards are not available, as when there is a single board left on a layer.

The new multiple picking head design, as shown in Diagrams C-G does not have these shortcomings. The construction uses two individual picking heads (with board pickers 184a and 184b), each with its own vertical axis which can be operated independently. They are mounted to a single trolley 36 and move together in the horizontal direction. The spacing on the two heads (with board pickers 184a and 184b) is wide enough to pick up two wide boards (2"×12" for example) without interference from each other. Boards 16 can easily be picked up from the same stack of lumber (e.g., from a first stack of lumber 146) if like sized boards are required or picked up from two different lumber stacks 146 and 152 to deliver different sized boards. The end process, such as sawing, can now receive unlike boards 16 in sequence and delivered in one cycle. Diagram-C shows one head (with board picker 184a) picking a first board 16 from one stack, Diagram-D shows another head (with board picker 184b) picking a second board 16 from another stack, Diagram-E shows both boards 16 being delivered to saw 14, Diagram-F shows heads (with board pickers 184a and 184b) retrieving a second pair of boards 16, but this time the two boards 16 are identical and taken from the same stack, and Diagram-G shows trolley 36 delivering both boards 16 to saw 14.

A further advantage of the design shown in Diagrams C-G is that if one picking head (with board picker 184a or 184b) malfunctions, the other head can still be used in a single board per cycle delivery mode to keep the end process supplied with lumber. This design shown in Diagrams C-G is not limited to double picking head design, as any number of picking heads could be added to a single trolley 36 to increase production by delivering multiple boards 16 per cycle. This design would be especially advantageous when feeding multiple saws 14 or processes with one lumber retrieval system.

In some examples, a lumber handling method of using a trolley for transferring a load toward a saw, wherein the load comprises selectively a first board, a second board, and a combination of both the first board and the second board, the lumber handling method is defined as follows: in a first selected operation, the trolley carrying the first board without the second board toward the saw; in a second selected operation, the trolley carrying the second board without the first board toward the saw; and in a third selected operation, the trolley carrying simultaneously the first board and the second board toward the saw.

Figure 4:
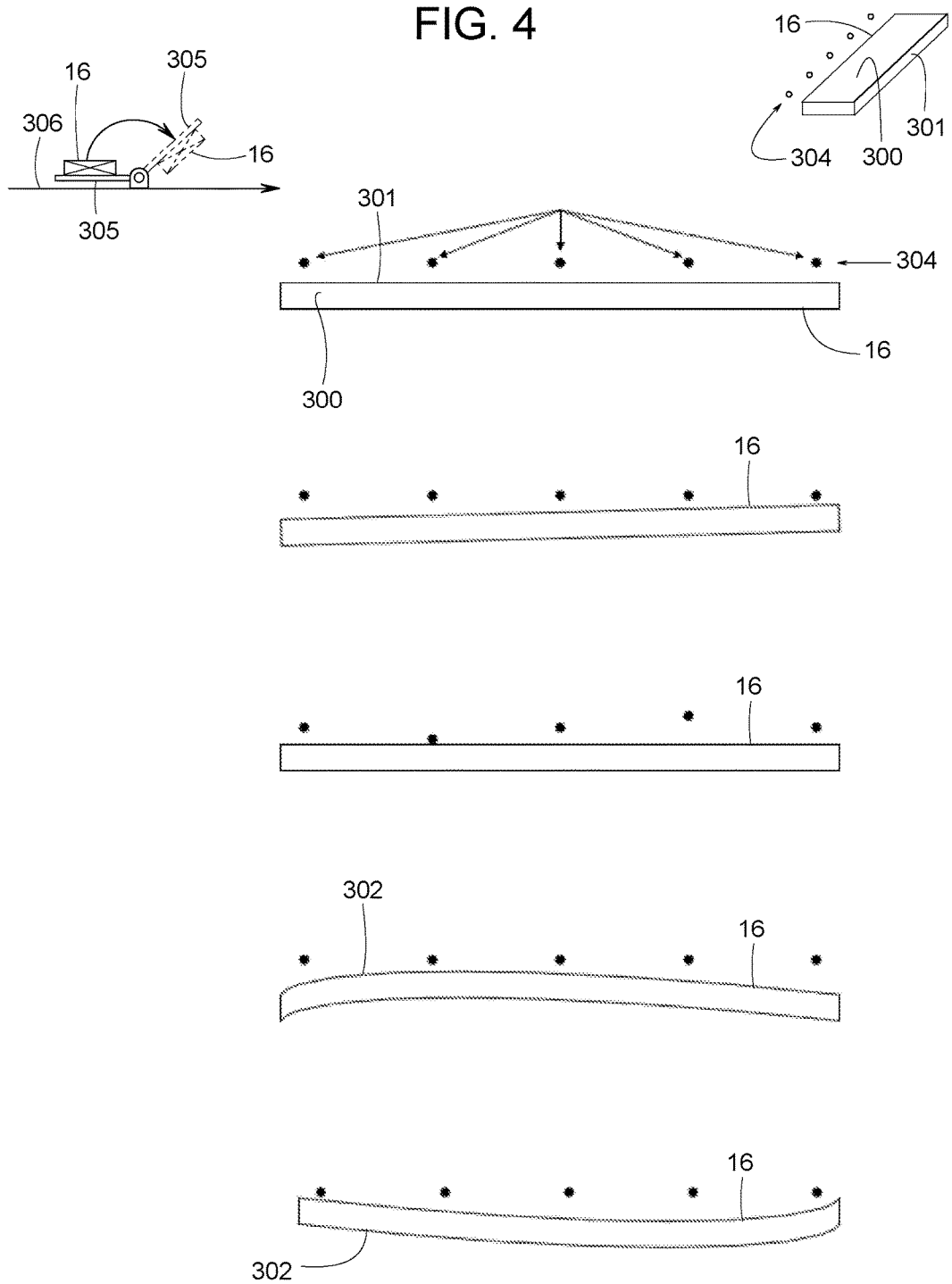
FIG. 4 is an assortment of views showing various example systems and methods for automatic lumber retrieval systems in accordance with the teachings disclosed herein.

Selective Crown Orientation (FIG. 4)

This is a description of a system for identifying the existence and direction of crowning in dimensional lumber and orient it correctly before sawing. Crown is a warp or curve that occurs along a narrow edge 301 of a board 16 (i.e., curve about an axis that is perpendicular to the widest face 300 of board 16). When lumber is used for the construction of roof trusses 126 or wall panels 128 it might be advantageous to identify the crown direction and orient the crown correctly before cutting it into components. In roof trusses, for example, it might be advantageous to assemble the truss with a convex crowned edge 302 facing upward in the truss. With the present invention, the non-symmetrical angles of the roof truss components are cut after the crown is detected and the lumber is oriented accordingly. This invention detects the crown direction and automatically orients board 16 correctly based on the requirements of the sawing operation. The crown can be introduced to the saw either convex or concave side first, depending on the job requirements.

This crown responsive system can be incorporated into lumber delivery system 10. Boards 16 are conveyed laterally on a series of conveyor chains or belts (schematically identified by reference number 306 of FIG. 4). The longest length of the board is perpendicular to the movement of the conveyor. A series of photoelectric sensors 304 are actuated when the leading or trailing edges (e.g., edge 301) of board 16 passes over or under them. In some examples, sensors 304 are spaced apart 12" (more or less depending on the accuracy required) and oriented along the length of a board in a straight line. Controller 162 (e.g., a PLC) captures the photoelectric input from each sensor 304 and records the time of each input as the board passes under or over the sensors. Software evaluates the timing of the inputs and plots the times as a line. The deviation from a straight line is calculated mathematically to determine the amount and direction of crown. Note that the board may be skewed on the conveyor and a perfectly straight board would actuate each sensor sequentially from one end to the other. This does not affect the calculation of the deviation from a straight line when crowned boards are scanned, nor does it affect the calculation for a straight board with no crown.

After the crown has been detected, a board turning device 305 may be used to reorient the board to the preferred crown direction (if required) to prepare it for sawing. Some systems may not require board turning device 305 to orient the board. Sending the crown direction to certain saws may cause the saw to re-orient the cuts in the components to match the identified crown, therefore producing parts with the desired crowning direction.

In some examples, a feature incorporated into the software of controller 162 is a self-learning mode. It can be difficult to orient all the photoelectric sensors 304 in a perfectly straight line and keep them straight. Because of this, a simple way to compensate for this has been devised. To calibrate, the operator puts controller 162 into a calibration mode and sends a perfectly straight board 16 through the system. Even though photoelectric sensors 304 might not be in a straight line, controller 162 can detect the curve generated by the straight board and the non-linear sensors and quickly compensate by computing a "map" or correction value for each sensor 304. This will now be applied to all subsequent calculations to correct for the non-aligned photoelectric sensors 304 until the system is calibrated again.

In some examples, a lumber handling method of using a trolley for transferring a board from a station toward a saw, wherein the board is warped in either a first direction or a second direction, the lumber handling method is defined as comprising: determining in which direction the board is warped; the trolley transferring the board between the station and the saw; the saw cutting the board; and based on which direction the board is warped, selectively inverting (turn board's upper face down) or not inverting (leave board's upper face facing up) the board prior to the saw cutting the board.

Main Trolley Plus Shuttle Trolley (FIG. 5)

In some examples, a lumber retrieval system's delivery speed is limited by the horizontal travel time required to deliver a board to the process and return to the position of the next board. Longer systems containing more lumber stacks are desirable from a quantity and variety standpoint but require longer delivery cycle time. Simply speeding up the travel speed can improve this, but maximum speed is limited by several factors. One factor is the required mechanical construction and electric motor power requirements to accelerate and decelerate the trolley and board combination. The most critical factor is one of safety. High speeds can cause machine damage in a runaway condition, but more importantly, can create danger to personnel. Higher speeds almost always increase emergency stopping time and also increase the severity of injury should an accident occur. Therefore, it is advantageous to operate the retrieval system at lower speeds while still maintaining high board delivery rates to the end process.

One design to take advantage of low speed movement with high delivery rates uses a lumber shuttle (shuttle trolley 36b) to deliver lumber 16 to the process (e.g., saw 14) while a main trolley 36a and a board picking head (with board picker 184) are picking up the next board 16. In some examples, lumber shuttle 36b operates on the same track 32 as the trolley 36a. Trolley 36a and shuttle 36b are equipped with independent motors and can freely move along track 32. The lumber shuttle 36b is equipped with a lumber receiving device 308 that can transport one or more boards. Boards picked up from one station 310 by trolley 36a are transferred (handed off) to shuttle 36b at variable locations on track 32. Lumber shuttle 36b then transports a single board 16 or multiple boards 16 to a board receiving area 316 to feed saw o14o or other process. During the lumber shuttle delivery process, the trolley 36a are free to pick up another board 16. If the lumber shuttle 36b has not returned when the next board 16 is ready to be handed off, trolley 36b is directed to move towards the trolley's receiving/hand-off area 316. Controller 162 controlling the system calculates the optimal hand off point (based on saving the most time) and directs trolley 36a and lumber shuttle 36b to meet at that point. If controller 162 determines that no time will be saved with a hand off, the hand off is canceled, and lumber shuttle 36b will move out of the trolley's way to allow trolley 36a to complete the delivery to receiving area 316 that, for example, feeds saw 14. It can be seen that working together in this manner is of great benefit especially if the travel distances involved are long.

The shuttle system described can receive multiple boards 16 in one hand off or multiple boards in multiple hand offs and deliver them to board receiving area 316. Another variation of this design includes two separate lumber shuttles 36b on opposite sides of trolley 36a. Each shuttle 36b would feed receiving area 316 for an individual process located at each end of the lumber delivery system.

In some examples, a lumber handling method of using a main trolley and a shuttle trolley for transferring a board from a station toward a saw, the lumber handling method is defined as comprising: the main trolley conveying the board from the station toward the shuttle trolley; and the shuttle trolley conveying the board from the main trolley toward the saw.

FIGS. 6-9 show various methods for setting up, calibrating and operating lumber handling system 10. These illustrations show system 10 comprising a track/trolley system 342, laser unit 284, a saw system 314, controller 162, and plurality of stations 310.

Stations 310 are for supporting a stack of lumber (e.g., first stack 146 and second stack 152) each comprising a plurality of boards 16. In the illustrated example, a first station 310a has first stack of lumber 146 comprising a first plurality of boards 144, and second station 310b has second stack of lumber 152 comprising a second plurality of boards 150. In some examples, the first plurality of boards 144 are of a different size than that of the second plurality of boards 150. Boards 144, for example, might be 2×4's while boards 150 are 2×6's. In another example, boards 144 and 150 might both be 2×4's but be of different lengths. In still other examples, boards 144 and 150 might be identical in size. In any case, stations 310 provide a supply of boards 16 to be processed by saw system 314.

Each station of the plurality of stations 310 comprises at least one of a parking spot 343 on floor 340, a lumber support 44 (e.g., a cart) on parking spot 343, and a board 16 on the cart or on some other type of lumber support. In some examples, a station 310 is just parking spot 343. In some examples, a station 310 is parking spot 343 plus a cart on parking spot 343, wherein no lumber is on the cart. In some examples, a station 310 is parking spot 343, a cart on parking spot 343, and at least one board 16 on the cart. Plurality of stations 310 includes at least first station 310a and second station 310b. The example illustrated in FIGS. 6-9 shows the plurality of stations 310 also having third station 310c and can actually have many more stations as well.

Track/trolley system 342 is for retrieving chosen boards 16 from stations 310 and delivering them to board-receiving area 316 that feeds saw 14. Track/trolley system 342 comprises at least one overhead track 32 and at least one trolley apparatus 36' that travels along track 32. Trolley apparatus 36' includes one or more trolleys 36. In some examples trolley apparatus 36' is a single trolley 36 carrying a board picker 184 (e.g., board picker 184a and 184b) and laser unit 284. Board picker 184 is schematically illustrated to represent any apparatus capable of lifting board 16 up from a lumber support or stack of lumber. Examples of board picker 184 include, but are not limited to, piercing tools, suction cups, hooks, grippers, etc. In some examples trolley apparatus 36' includes a first trolley for carrying board picker 184 and a separate second trolley for carrying laser unit 284. In some examples, drive system 272 (FIG. 2) moves trolley apparatus 36' along track 32 in response to an output signal 282 from controller 162. Controller 162 receives a feedback signal 267 from laser unit 284.

Laser unit 284 is primarily for finding the right board from the right station. Laser unit 284 is schematically illustrated to present any device that emits laser beam 156 for sensing a distance between a surface and the laser emitting device. An example of laser unit 284 includes, but is not limited to, a model RF603-260/1250-232-I-IN-AL-CC-3 laser triangulation position sensor provided by Riftek of Minsk, Russia. Input 267 and output 288 schematically represent control communication between controller 162 and laser unit 284. Upon scanning the upper surface profile of stacks of lumber, laser unit 284 identifies the location of each stack of lumber relative to each other and in relation to board receiving area 316 because controller 162 being in communication with laser unit 284 and a drive system 272 that moves trolley 36 can correlate laser scan readings with the position of the trolley's board picker 184.

Saw system 314 comprises board receiving area 316 and at least one saw 14 for cutting boards to size. Board receiving area 316 is schematically illustrated to represent any structure for receiving boards 16 from trolley apparatus 36' and transferring those boards to saw 14. Examples of board receiving area 316 include, but are not limited to, a conveyor, a ramp, a chute, a part transfer mechanism, board turning device 305, and various combinations thereof. Saw 14 cuts the boards received from area 316 to create a kit of cut boards 344 (e.g., pieces 112, 114, 116, 118 and 120) that are assembled to create a structural board assembly 127 (e.g., roof truss 126 or wall panel 128). In some examples, a plurality of structural board assemblies 127 are grouped as specified in a job order 330 that is entered into controller 162. Job order 330, for example, might specify a certain group of structural board assemblies 127 that are intended to be shipped to a particular customer or job site.

Controller 162 is schematically illustrated to present any electrical device able to provide various outputs in response to various inputs. In response to the inputs, controller 162 controls various components of system 10 including, but not limited to, controlling drive system 272 of trolley system 342, controlling board picker 184 and various actuators thereof, controlling laser unit 284, and controlling digital display 188 (e.g., a touchscreen). Examples of controller 162 include, but are not limited to, a single computer, a system of multiple computers, a single PLC (programmable logic controller), a system of multiple PLCs, various combinations of one or more computers and PLCs, and various combinations of computers, PLCs, sensors, laser units, switches, touchscreens, relays, etc. A specific example of controller 162 is a model CP6201-0001-0200 industrial computer by Beckhoff of Verl, Germany.

Figure 7:
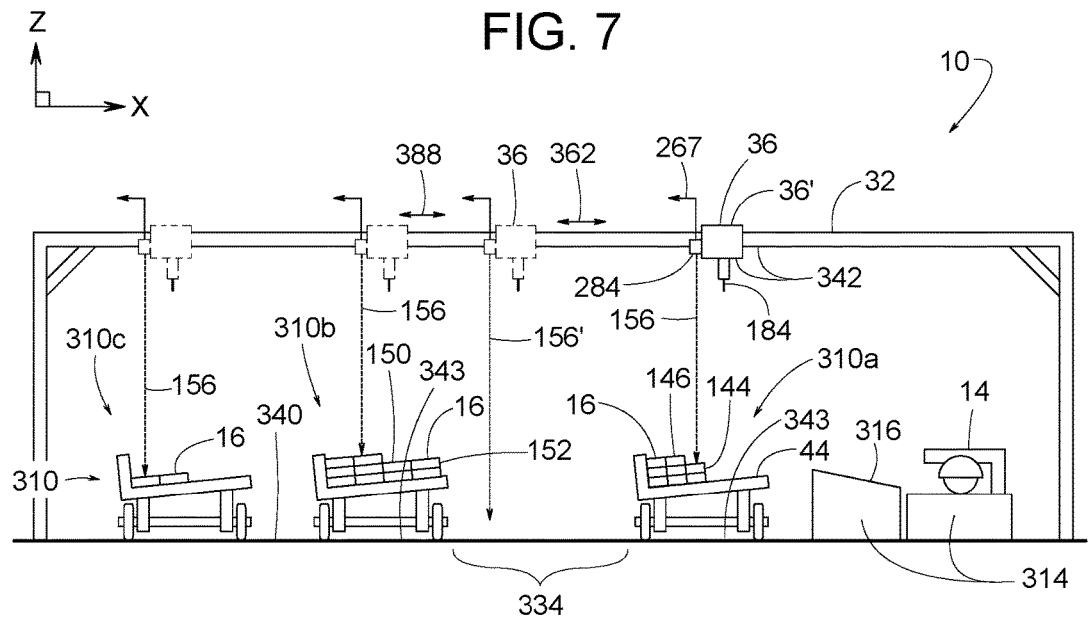
FIG. 7 is a schematic diagram similar to FIG. 6 showing the example system and method for automatically setting up and calibrating lumber stations, wherein the stations are stocked with lumber.

The lower portions of FIGS. 6 and 7 show a basic flow chart or algorithm that illustrates some example data processing functions of controller 162. In many cases, these data processing functions are part of some example lumber handling methods that pertain to lumber handling system 10. At least one such lumber handling method and system will now be further described with reference to the drawing figures.

FIGS. 2 and 6-9 illustrate carrying laser unit 284 above and over the plurality of stations 310 via trolley apparatus 34' of track/trolley system 342, wherein track/trolley system 342 comprises trolley apparatus 36' and track 32 along which trolley apparatus 36' travels. Arrow 346 of FIG. 6 represents trolley apparatus 36' moving laser beam 156 over stations 310, which illustrates determining a plurality of floor-to-track error values 348 (e.g., plurality of laser calibration readings 348a or a plurality of vertical distance readings 348b) that vary based on floor 340 and track 32 deviating from being parallel to each other. Example means for measuring the track-to-floor deviations or error values 348 include, but are not limited to, laser scanning the height of a certain lower target point 350 on each cart, laser scanning a single board 16 on each cart, and manually measuring 355 a vertical distance 352 from some upper reference point 354 on trolley apparatus 36' to lower target point 350 of each cart (or to lower target point 350' on a single board 16 or to lower target point 350" on floor 340). Arrow 360 illustrates recording the plurality of floor-to-track error values 348 on controller 162.

In some examples, a laser calibration reading is a substantially vertical distance of the laser beam between the laser unit and a laser beam obstruction. In some examples, the laser calibration reading is measured directly by the laser unit. A vertical distance reading is a manually measured, substantially vertical distance from an upper reference point (e.g., face of the laser unit, fixed point on the frame of the trolley apparatus, etc.) to a lower target point (e.g., floor itself, frame of the cart, a board resting on the cart, etc.), wherein the upper reference point is substantially fixed vertically relative to the laser unit, and the lower target point is directly below the upper reference point Arrow 362 of FIG. 7 represents scanning the plurality of stations 310 with laser unit 284 as trolley apparatus 36' carries laser unit 284 over the plurality of stations 310 during a normal operating period. The normal operating period is when laser unit 284 repeatedly scans stations 310 for the purpose of finding a board 16 to be retrieved from the right station 310 and for monitoring the number of boards at each station 310. Arrow 364 represents recording a plurality of lumber scanned readings 366 via controller 162 as a result of scanning the plurality of stations 310 during the normal operating period. Block 368 represents calculating a plurality of error-compensated readings 370 via controller 162 based on a comparison or difference of lumber scanned readings 366 and the plurality of floor-to-track error values 348.

The top portion of FIG. 7 shows storing first stack of lumber 146 at first station 310a, wherein first stack of lumber 146 comprises the first plurality of boards 144 each of a first board size 371 (e.g., 2×4). Arrow 372 represents entering first board size 371 into controller 162. The top portion of FIG. 7 also shows storing second stack of lumber 152 at second station 310b, wherein second stack of lumber 152 comprises the second plurality of boards 150 each of a second board size 374 (e.g., 2×6) that is distinguishable from first board size 371. Arrow 376 represents entering second board size 374 into controller 162.

Block 378 represents controller 162 calculating a first quantity of boards 380 of first plurality of boards 146 based on the plurality of error-compensated readings 370 and first board size 371. Readings 370 identify a fairly accurate cross-sectional area of each stack of lumber, and dividing that by the cross-sectional area of a single board provides the number of boards in that stack. Block 382 represents controller 162 calculating a second quantity of boards 384 of second plurality of boards 150 based on the plurality of error-compensated readings 370 and second board size 374.

Figure 8:
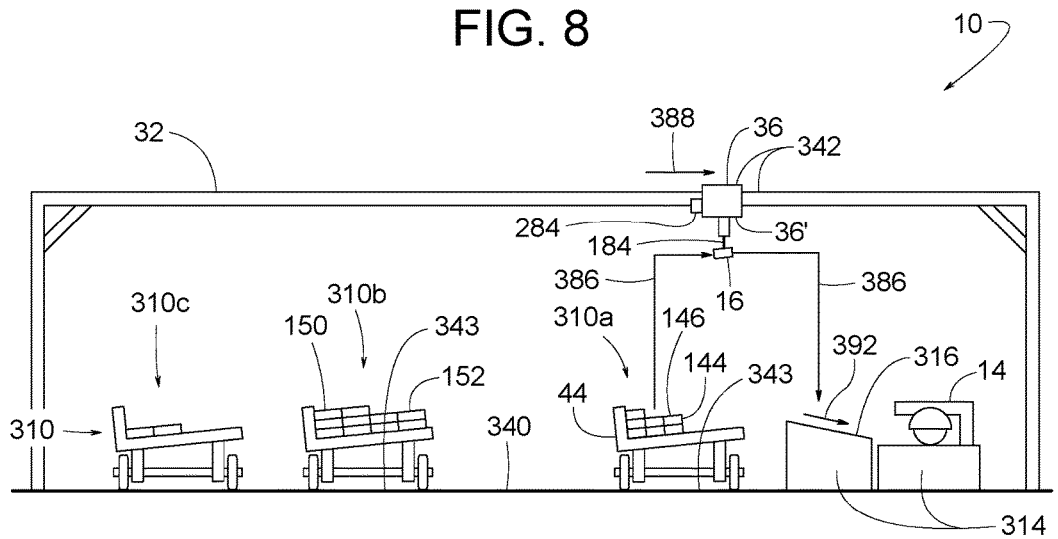
FIG. 8 is a schematic diagram showing an example method of operation of the automatic lumber retrieval system shown in FIGS. 6 and 7.
Figure 9:
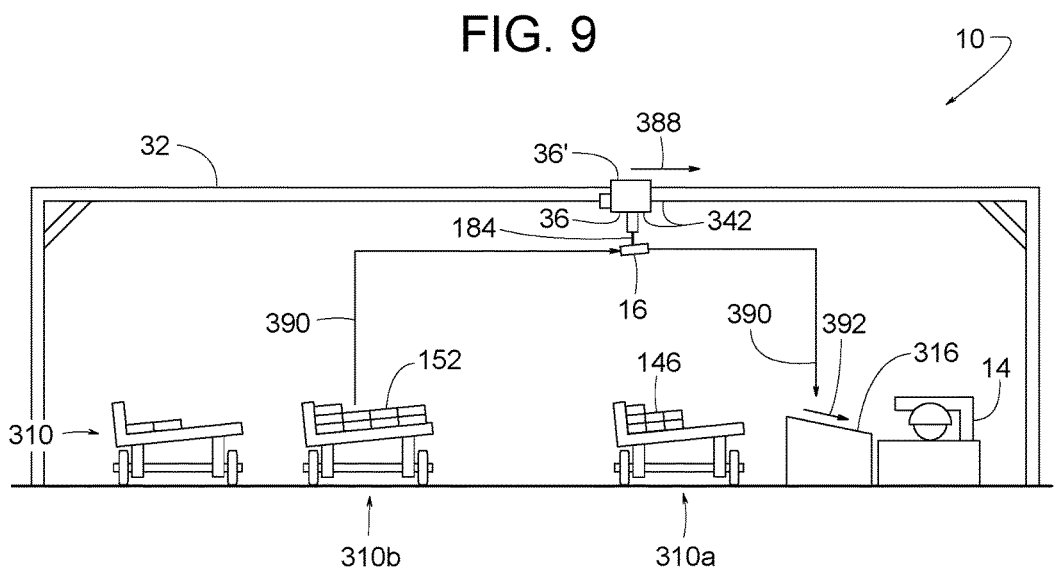
FIG. 9 is a schematic diagram showing another example method of operation of the automatic lumber retrieval system shown in FIGS. 6 and 7.

In FIG. 8, arrows 386 illustrate track/trolley system 36' carrying a first board 16 along a trolley travel direction 388 from first station 310a to board-receiving area 316, wherein first station 310a is between second station 310b and board-receiving area 316. Trolley travel direction 388 is substantially parallel to track 32. Arrows 390 of FIG. 9 represents track/trolley system 36' carrying a second board 16 along trolley travel direction 388 from second station 310b, over first station 310a, and to board-receiving area 316. Arrow 392 of FIGS. 2, 8 and 9 represents transferring boards 16 from board-receiving area 316 to saw 14.

FIG. 6 illustrates an example laser-scanning method for automatically calibrating system 10 to compensate for floor 340 and track 32 deviating from parallel alignment with each other. The trolley's travel movement, as indicated by arrow 362, and laser beam 156 detecting lower target point 350 (e.g., point 350 on the cart or point 350' on a single board 16 or point 350" on floor 340) at each station 310 represents scanning the plurality of stations 310 with laser unit 284 as trolley apparatus 36' carries laser unit 284 in the trolley travel direction 388 over stations 310 during a calibration period (FIG. 6) that occurs before the normal operating period (FIG. 7). Upon scanning 362 the plurality of stations 310 during the calibration period, controller 162 records a plurality of laser calibration readings 348a that vary as a result of floor 340 and track 32 deviating from being parallel to each other.

Alternatively, FIG. 6 illustrates an example manual means for calibrating system 10 to compensate for floor 340 and track 32 deviating from parallel alignment with each other. The trolley's travel movement, as indicated by arrows 362 and 388 and dimension 350 or 352' extending from an upper point 354 on trolley apparatus 36' to lower target point 350, 350' or 350" represents selectively positioning trolley apparatus 36' to a plurality of locations along trolley travel direction 388. Tape measure 355 and dimension 352 (alternatively dimension 352') represents manually measuring a plurality of vertical distance readings from upper reference point 354 to lower target point 350 (or point 350' or point 350") at each station 310, and doing so during a calibration period (FIG. 6) that occurs before the normal operating period (FIG. 7), wherein upper reference point 354 is substantially fixed vertically and horizontally relative to laser unit 284, and lower target point 350 (or point 350' or point 350") is substantially directly underneath upper reference point 354 when vertical distance 352 is measured. Lower target point 350 (or point 350' or point 350") is substantially fixed horizontally with reference to upper reference point 350 (at the time of manual measurement), and lower target point 350 is at a substantially fixed vertical distance from floor 340 at a localized area 394 directly beneath lower target point 350. Arrow 396 represents manually entering the plurality of vertical distance readings 352 into controller 162, wherein readings 352 vary as a result of floor 340 and track 32 deviating from being parallel to each other, and the plurality of floor-to-track error values 348b are determined based on the plurality of vertical distance readings 350.

Arrow 362 and the various positions of trolley apparatus 36', as shown in FIG. 7, represents scanning the plurality of stations 310 at least once with laser unit 284 as trolley apparatus 36' carries laser unit 284 over the plurality of stations 310. FIG. 2 shows controller 162 creating an elevation profile map 164 of the plurality of stations 310 in response to laser unit 284 scanning the plurality of stations 310. Laser beam 156' shown in FIG. 6 and/or FIG. 7 represents detecting a gap 334 exceeding a predetermined width between first station 310a and second station 310b by scanning the plurality of stations 310 with laser unit 284. Section 398 of digital image 164 represents controller 162 noting the location of gap 334 and defining a relative location of first station 310a and/or second station 310b relative to each other based on the location of gap 334. Controller 162 noting a location of gap 334 means that controller 162 at least temporarily records, stores or pays particular attention to the location of gap 334.

In some examples, gap 334 is detected automatically by laser unit 284 and controller 162. In other examples, gap 334 is detected with the assistance of a worker observing when laser beam 156 enters gap 334. For instance, in some examples, detecting gap 334 exceeding a predetermined width is achieved through a manual visual observation 400 of laser unit 284, trolley system 36', and/or laser beam 156' as laser unit 284 scans the plurality of stations 310. Arrow 402 of FIG. 6 and FIG. 7 represents manually entering the location of the gap into controller 162.

Arrow 404 of FIGS. 6 and 7 represents defining a job order 330 that specifies making a certain set of structural board assemblies 127 of a predetermined quantity. For example, a job order 330 might specify making ten roof trusses 26 and four wall panels 128. Arrow 404 also represents entering job order 330 into controller 162. Block 406 represents controller 162 determining whether the first plurality of boards 144 and the second plurality of boards 150 are of sufficient quantities to satisfy the requirements of job order 330. Lights 408 (e.g., lights 408a, 408b and 408c) serve as an alert that identifies which if any stations 310 have an insufficient quantity of boards for job order 330. In the example illustrated in FIG. 7, lights 408b and 408c indicate that stations 330b and 330c need more boards. In some examples, lights 410 (e.g., lights 410a, 410b and 410c) serve as a notice that identifies which of the plurality of stations 310 will most likely need to be replenished first based on the current and upcoming job orders and the quantity of boards in the various stacks of lumber. In the illustrated example, light 410b indicates second station 310b will be the first needing to be replenished, even though third station 310c has fewer boards.

In some examples, when the actual board size of a stack of lumber is known, digital profile 164 can be enhanced to create a digital image showing not only the outline or elevation profile map of the stack but also showing individual boards within the stack. The lower portion of FIG. 7 shows screen 188 of controller 162 displaying a first image 190a depicting first stack of lumber 146 based on the elevation profile map 164 and the first board size, wherein first image 190a shows a first plurality of individual boards within the first stack of lumber 146. Likewise, controller 162 displays a second image 190b depicting the second stack of lumber 152 based on elevation profile map 164 and the second board size, wherein second image 190b shows a second plurality of individual boards within the second stack of lumber 152.

In FIG. 2, arrows 412 and 414 are examples illustrating saw 14 cutting at least a first board 112 and a second board 114 to create a kit of cut boards 315. Arrows 122 represent assembling the kit of cut board 315 to create a structural board assembly 127.

The laser scanning process shown in FIG. 6 illustrates determining the first board size (board width) by scanning a first individual board 16 of the first plurality of boards 144, and determining the second board size (board width) by scanning a second individual board 16 of the second plurality of boards 150. The board size is determined based on how far trolley apparatus 36' travels from a front edge of the board to the back edge of the board. In some examples, the board's vertical thickness is assumed to be a nominal two inches (e.g., about 1.5 inches).

Although certain example methods, apparatus and articles of manufacture have been described herein, the scope of the coverage of this patent application is not limited thereto. On the contrary, this patent application covers all methods, apparatus and articles of manufacture fairly falling within the scope of the appended claims either literally or under the doctrine of equivalents.

The invention claimed is:

1. A lumber handling method for retrieving a plurality of boards of various sizes from a plurality of stations supported by a floor, the plurality of stations include at least a first station and a second station, the lumber handling method comprising:
   carrying a laser unit above and over the plurality of stations via a trolley apparatus of a track/trolley system, wherein the track/trolley system comprises the trolley apparatus and a track along which the trolley apparatus travels;
   scanning the plurality of stations at least once with the laser unit as the trolley apparatus carries the laser unit over the plurality of stations;
   creating, via a controller, an elevation profile map of the plurality of stations in response to the laser unit scanning the plurality of stations;
   detecting a gap exceeding a predetermined width between the first station and the second station by scanning the plurality of stations with the laser unit;
   noting a location of the gap via the controller;
   defining a relative location of at least one of the first station and the second station relative to each other based on the location of the gap;
   storing a first stack of lumber at the first station, the first stack of lumber comprising a first plurality of boards each of a first board size;
   entering the first board size into the controller;
   storing a second stack of lumber at the second station, the second stack of lumber comprising a second plurality of boards each of a second board size that is distinguishable from the first board size;
   entering the second board size into the controller;
   calculating, via the controller, a first quantity of boards of the first plurality of boards based on the elevation profile map and the first board size;
   calculating, via the controller, a second quantity of boards of the second plurality of boards based on the elevation profile map and the second board size;
   carrying, via the track/trolley system, a first board along a trolley travel direction from the first station to a board-receiving area, the first station being between the second station and the board-receiving area, the trolley travel direction being substantially parallel to the track;
   carrying, via the track/trolley system, a second board along the trolley travel direction from the second station, over the first station, and to the board-receiving area; and
   transferring the first board and the second board from the board-receiving area to a saw.

2. The lumber handling method of claim 1, wherein detecting the gap exceeding a predetermined width is achieved through a manual visual observation of at least one of the laser unit, the trolley system and a laser beam emitted by the laser unit as the laser unit scans the plurality of stations, and the lumber handling method further comprising manually entering the location of the gap into the controller.

3. The lumber handling method of claim 1, wherein detecting the gap exceeding a predetermined width and noting the location of the gap are achieved automatically by the controller and the laser unit as a result of the laser unit scanning the plurality of stations.

4. The lumber handling method of claim 1, further comprising:
   defining a job order that specifies making a set of structural board assemblies of a predetermined quantity;
   entering the job order into the controller;
   determining, via the controller, whether the first plurality of boards and the second plurality of boards are of sufficient quantity to meet the job order; and
   providing, via the controller, an alert that identifies which if any of the plurality of stations has an insufficient quantity of boards to meet the job order.

5. The lumber handling method of claim 4, further comprising:
   providing, via the controller, a notice that identifies which of the plurality of stations will most likely need to be replenished first based on the first stack of lumber, the second stack of lumber, and the job order.

6. A lumber handling method for retrieving a plurality of boards of various sizes from a plurality of stations supported by a floor, the plurality of stations include at least a first station and a second station, the lumber handling method comprising:
   carrying a laser unit above and over the plurality of stations via a trolley apparatus of a track/trolley system, wherein the track/trolley system comprises the trolley apparatus and a track along which the trolley apparatus travels;
   scanning the plurality of stations with the laser unit as the trolley apparatus carries the laser unit over the plurality of stations;
   creating, via a controller, an elevation profile map of the plurality of stations in response to the laser unit scanning the plurality of stations;
   storing a first stack of lumber at the first station, the first stack of lumber comprising a first plurality of boards each of a first board size;
   entering the first board size into the controller;
   storing a second stack of lumber at the second station, the second stack of lumber comprising a second plurality of boards each of a second board size that is distinguishable from the first board size;

entering the second board size into the controller;
calculating, via the controller, a first quantity of boards of the first plurality of boards based on the elevation profile map and the first board size;
calculating, via the controller, a second quantity of boards of the second plurality of boards based on the elevation profile map and the second board size;
displaying, via the controller, a first image depicting the first stack of lumber based on the elevation profile map and the first board size, the first image showing a first plurality of individual boards within the first stack of lumber;
displaying, via the controller, a second image depicting the second stack of lumber based on the elevation profile map and the second board size, the second image showing a second plurality of individual boards within the second stack of lumber;
carrying, via the track/trolley system, a first board along a trolley travel direction from the first station to a board-receiving area, the first station being between the second station and the board-receiving area, the trolley travel direction being substantially parallel to the track;
carrying, via the track/trolley system, a second board along the trolley travel direction from the second station, over the first station, and to the board-receiving area;
transferring the first board and the second board from the board-receiving area to a saw;
cutting at least the first board and the second board with the saw to create a kit of cut boards; and
assembling the kit of cut board to create a structural board assembly.

7. The lumber handling method of claim 6, further comprising:
determining the first board size by scanning a first individual board of the first plurality of boards; and
determining the second board size by scanning a second individual board of the second plurality of boards.

8. The lumber handling method of claim 6, further comprising:
defining a job order that specifies making a set of structural board assemblies of a predetermined quantity;
entering the job order into the controller;
determining, via the controller, whether the first plurality of boards and the second plurality of boards are of sufficient quantity to meet the job order; and
providing, via the controller, an alert that identifies which if any of the plurality of stations has an insufficient quantity of boards to meet the job order.

9. The lumber handling method of claim 8, further comprising:
providing, via the controller, a notice that identifies which of the plurality of stations will most likely need to be replenished first based on the first stack of lumber, the second stack of lumber, and the job order.

* * * * *